March 18, 1947.   N. ERLAND AF KLEEN   2,417,761
TEMPERATURE CONTROLLING SYSTEM
Filed March 13, 1941   4 Sheets-Sheet 1

INVENTOR.
Nils Erland af Kleen
BY C. P. Goepel
his ATTORNEY

UNITED STATES PATENT OFFICE 2,417,761

TEMPERATURE CONTROLLING SYSTEM

Nils Erland af Kleen, Stockholm, Sweden, assignor to Kleen Refrigerator, Inc., Hoboken, N. J., a corporation of Delaware Application March 13, 1941, Serial No. 383,123

2 Claims. (Cl. 257—3)

This invention relates to new and useful improvements in a combined heating and cooling system for a mass, body, room, space or the like, adapted to maintain a predetermined temperature condition therein at substantially a constant level where the conditions outside said mass, etc., are variable between points relatively higher and relatively lower than the said constant level, the present invention being directed more particularly to a system of control for selectively controlling the heating and cooling of the mass and for regulating the amount of such heating and cooling.

The present invention consists in a control system having a plurality of control members responsive to the temperature conditions in the mass or the like being controlled and to the temperature conditions outside the said mass, for selectively controlling the heating and cooling of said mass in accordance with temperature variations therein, and for regulating the amount of such heating or cooling in accordance with the temperature variations outside the said mass.

The invention consists also in a control system of this character, responsive to the temperature conditions inside and outside the mass being controlled, wherein all of the control members of the system are centralized to provide a unitary controlling device with only the separate thermostat impulse lines leading to the different points inside and outside the mass, to be influenced by the different temperature conditions.

The invention consists further in a control system having a plurality of thermostat members responsive to respectively different temperature conditions, all of said thermostat members being adjustable by a common regulator for different temperature conditions to be maintained in the mass.

Finally, the invention consists in any other novel features hereinafter set forth in the following description, illustrated by way of examples in the accompanying drawings, and more particularly pointed out in the appended claims.

Referring to the drawings in which numerals of like character designate similar parts throughout the several views, Fig. 1 is a diagrammatic view of a temperature regulating installation consisting of a combined heating and cooling system including heating means and cooling means for an enclosed space or the like, the operation of the heating and cooling means being selectively controlled and the amount of heating and cooling being regulated by a unitary control device in accordance with the present invention;

Figure 1:
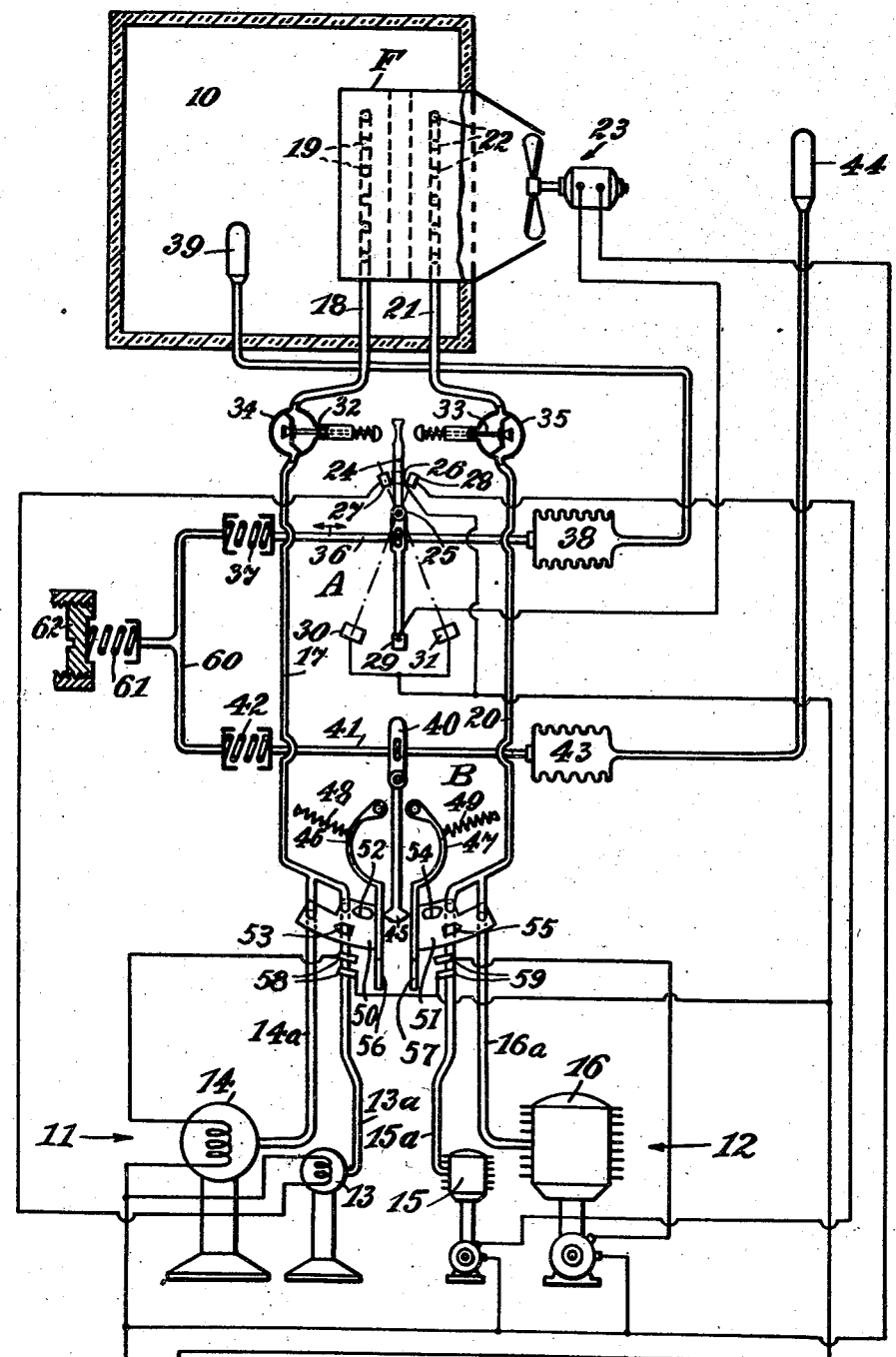

In the drawings, referring first to Fig. 1, the temperature controlling installation diagrammatically illustrated comprises a heating plant and a cooling plant generally indicated at 11 and 12, respectively, the former shown as including a pair of heating units 13 and 14 of respectively different capacities, and the latter including a pair of cooling units 15 and 16, also of respectively different capacities. From heating unit 13 the heating medium flows through conduit line 13a, into conduit 17, and into line 18 leading to a bank of coils 19 arranged in the enclosed space 10, while from heating unit 14 the heating medium flows through conduit line 14a, into conduit 17, and into line 18 to the bank of coils 19.

From cooling unit 15, the cooling medium flows through conduit line 15a, into conduit 20, and into line 21 leading to a second bank of coils 22 arranged in the enclosed space 10 adjacent coils 19, and from cooling unit 16, the cooling medium flows through conduit line 16a, into conduit 20, and into line 21 leading to the coils 22. A motor-driven fan assembly 23 arranged adjacent the coils 19 and 22, operates to circulate air from outside the mass 10 through the coils and into the space 10 by way of an air duct F in which the coils 19 and 22 are disposed.

For convenience, the heating and cooling plants 11 and 12, respectively, have been shown as electrically operated, but obviously any other suitable form of energy may be utilized. In the form shown in Fig. 1, the operation of units 13 and 15 is controlled selectively by a thermostat switch arrangement generally indicated as A, responsive to the temperature conditions inside the space 10, while the operation of units 14 and 16 is similarly controlled by a separate thermostat switch arrangement B responsive to the temperature conditions outside the said space. Switch arrangement A comprises a switch lever 24, fulcrumed intermediate its ends as at 25 and carrying an electrode 26 adjacent its upper end connected to the minus line of the source of electricity, which electrode cooperates with a pair of fixed electrodes 27 and 28 disposed on opposite sides of the switch lever 24, to make and break the circuit to the units 13 and 15, respectively. A second electrode 29 carried by the switch lever 24 cooperates with a second pair of fixed electrodes 30 and 31 also arranged on opposite sides of the switch lever, for controlling the circuit to the fan assembly 23 during the operation of the positive and negative energy plants 11 and 12.

The switch lever 24 cooperates at its upper end with valve stems 32 and 33, the former actuating valve 34 for controlling the flow of heating medium to the coils 19 and the latter actuating valve 35 for controlling the flow of cooling medium to the coils 22.

The switch lever 24 is rockable on its fulcrum 25 from one position to the other by means of a reciprocatable transverse operating rod 36 movable in one direction by coil spring 37 and in the opposite direction by bellows diaphragm 38 responsive to a fluid pressure system 39 influenced by the temperature conditions inside the space 10.

It will thus be seen that upon a rise in temperature conditions in the space 10 above the predetermined level for which the switch arrangement A has been set, the bellows diaphragm 38 will rock switch lever 24 on its fulcrum 25 in a direction to bring electrode 26 into contact with electrode 28 to energize the cooling unit 15. Simultaneously, the switch lever actuates valve 35 to permit the cooling medium to flow from conduits 20 and 21 into the coils 22 and the second electrode 29 on the switch lever 24 will be brought into contact with the electrode 30 to energize the fan assembly 23.

Upon a drop in temperature conditions in the space 10 below the predetermined level, the pressure in the fluid pressure system 39 will correspondingly drop and switch lever 24 will be rocked in the opposite direction by the spring 37 so that the electrode 26 will then contact electrode 27 to energize the heating unit 13; the lever will actuate valve 34 to permit the flow of heating medium through conduits 17 and 18 to the coil 19, and electrode 29 will contact electrode 31 to energize the fan assembly 23.

The amount of heating or cooling medium delivered to the respective coils 19 and 22 is regulated by switch arrangement B comprising a fulcrumed switch lever 40 operatively connected to a transverse reciprocatable rod 41 movable in one direction by coil spring 42, and in the opposite direction by a bellows diaphragm 43 responsive to a fluid pressure system 44 influenced by the temperature conditions outside the space 10. The switch lever 40 terminates at one end in an enlarged head 45 disposed between a pair of arms 46 and 47 pivotally mounted on opposite sides of the switch lever and normally urged toward one another by springs 48 and 49, respectively. The free end of each of the pivoted arms 46 and 47 carries a control member 50 and 51, respectively, the former connected to the conduit 17 and the latter connected to conduit 20. Control member 50 is adapted to cooperate with a pair of complementary members 52 and 53 connected to conduits 13a and 14a, respectively, for progressively varying the amount of heating medium flowing from the heating plant 11 into the conduit 17. Control member 51 cooperates with a similar pair of complementary members 54 and 55 connected to conduits 15a and 16a, respectively, for progressively varying the amount of cooling medium flowing from the cooling plant 12 into conduit 20.

Each of the pivoted arms 46 and 47 carries a contact brush 56 and 57, respectively, cooperating with a separate pair of electrodes 58 and 59 to close the circuit to the corresponding units 14 and 16 when the control members 50 and 51 of the respective arms 46 and 47 are moved into engagement with their complementary members 53 and 55.

The operation of the switch arrangement B is believed obvious from the foregoing description, it being clear that for gradually dropping temperature conditions outside the space 10 below the predetermined level being maintained in said space, switch lever 40 will be rocked in one direction by the spring 42 against the fluid pressure system 44, to move the control member 50 on the pivoted arm 45, first across the complementary member 52 to permit the flow of an increasing amount of heating medium through the conduit 13a into conduit 17 to be delivered to the coils 19, and then across member 53 to permit the flow of a further increasing amount of heating medium through the conduit 14a to be delivered to the coils. For gradually rising temperature conditions outside the space 10 above the predetermined level being maintained therein, the switch lever 40 will be rocked in the opposite direction by the fluid pressure system 44 against the spring 42, when control member 51 on the pivoted arm 46 will first be moved across the complementary member 54 and then across member 55 to permit the flow of a progressively increasing amount of cooling medium, first from cooling unit 15 and then from cooling unit 16 of the cooling plant 12.

In order to vary the settings of the switch arrangements A and B for different temperature conditions to be maintained in space 10, I employ a common regulator comprising a movable yoke member 60 cooperating with the springs 37 and 42, to adjust the loading pressures of the latter against the fluid pressure systems 39 and 44. The yoke member 60 is in turn loaded by coil spring 61, the pressure of which is regulatable by a threaded adjusting nut 62.

It will thus be seen that I have provided a control system responsive to the temperature conditions inside the space 10 being controlled as well as to the temperature conditions outside the said space for selectively determining the kind of medium, that is heating or cooling to be supplied and for regulating the amount of such medium required to maintain substantially constant predetermined temperature conditions in the space 10 for either relatively higher or lower temperature conditions outside the said space. Furthermore, the control members (thermostats A and B) of the control system herein disclosed are centralized to form a unitary device that can be located at any convenient point and, by simple adjustment of the threaded nut 62, can be set for the maintenance of different temperature conditions in the space 10.

Figure 2:
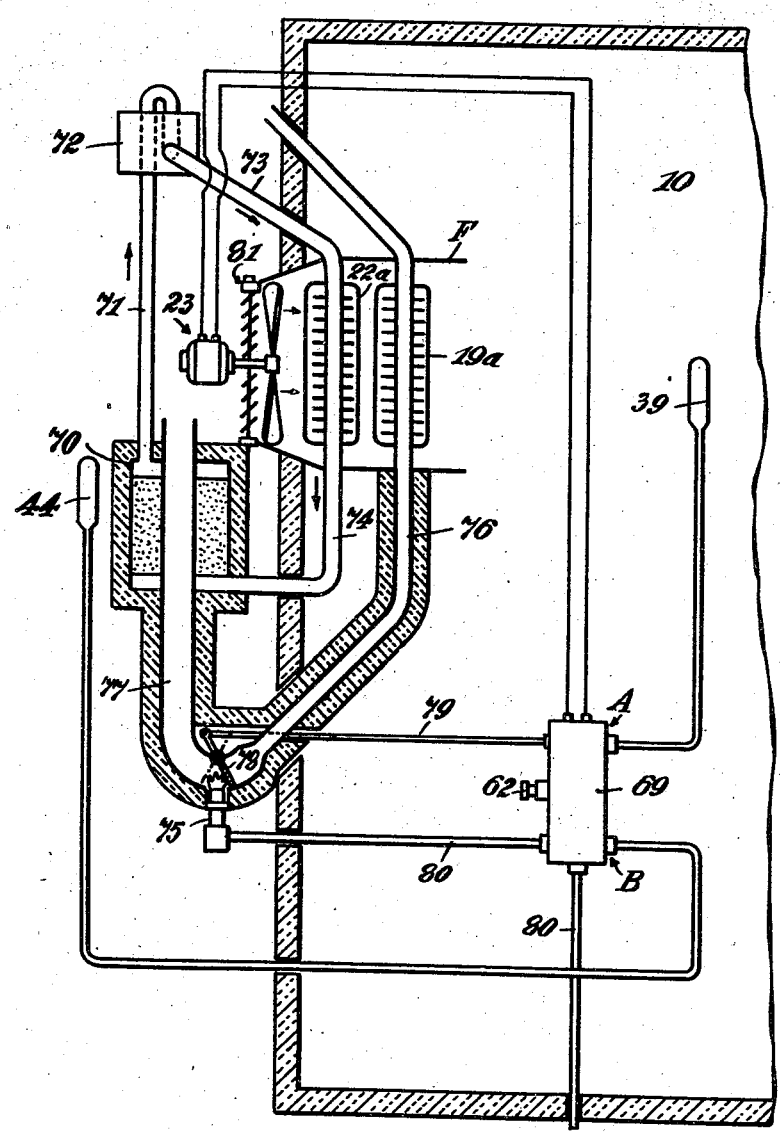
Fig. 2 is a diagrammatic view of an air conditioning unit for a room or the like, wherein the heating and cooling systems of the unit are selectively controlled by a unitary control device such as that shown in Fig. 1, and wherein the cooling system is an absorption refrigerating unit arranged outside the room being controlled.

In Fig. 2, the unitary control device heretofore described is generally indicated as 69 and is shown applied to an air conditioning unit comprising a refrigerating system and a heating system disposed outside a room or space 10 being controlled, for delivering cooling and heating media, respectively, to corresponding cooling and heating members 22a and 19a located inside the room or space 10 being controlled. The refrigerating system may be of any well known type such, for example, as compressor, adsorption or absorption, either continuous or intermittent, having one or more operating units, that shown in Fig. 2 being a single unit of the absorption type including a generator 70, adapted to be heated for the circulation of the refrigerant through outlet conduit 71, condenser 72, conduit 73, cooling member 22a, (evaporator) return conduit 74, and other well known parts necessary in a continuous absorption system such as an absorber vessel, heat exchanger, etc., (not shown) as they form no part of the present invention.

The heating system may also be of any well known type, that is, direct or indirect system or systems utilizing steam, hot water, air, or any other suitable heating fluid, heated by electricity, gas, oil, etc. For simplicity, I have shown a direct heating system utilizing gas as the fuel for a gas burner 75 generating hot gases which may be delivered either to the heating member 19a by way of flue conduit 76 or to the generator 70 of the refrigerating system by way of flue conduit 77. Preferably the generator 70 and the flue conduits 76 and 77 are surrounded by insulating material to prevent heat losses. The passage of the hot gases into the flue conduit 76 and 77 is selectively controlled by a pivoted valve plate 78 operatively connected to a reciprocatable rod 79 actuated by the thermostat A of the unitary control device 69 responsive to the temperature inside the room 10. The thermostat B of the control device actuates a valve (not shown) interposed in the gas supply line 80 to regulate the amount of gas flowing to the gas burner 75 in accordance with the temperature outside the room 10.

As in the case of the installation shown in Fig. 1, a motor driven fan assembly 23 controlled by the thermostat A of the control device 69, operates to circulate air over the heating and cooling members 19a and 22a. If desired, the amount of air drawn by the fan assembly 23 from outside the room 10 can be regulated by any suitable damper mechanism 21 at the inlet end of the air duct F, adjustable either by hand, or automatically, by any well known mechanism (not shown).

In operation, with the valve plate 78 occupying the position shown, the hot gases generated by the burner 75 pass into conduit 77 to heat the generator 70 so that the refrigerating system is set into operation to deliver the refrigerant to the cooling member 22a to thereby lower the temperature in the room 10. The amount of refrigerant delivered to the cooling member 22 is dependent upon the amount of heat supplied to the generator 70 by the burner 75 and this is controlled by the thermostat B responsive to the conditions outside the room 10 which regulates the amount of gas supplied to the burner. In other words, for a gradual rise in temperature outside the room 10, a correspondingly increasing amount of gas is supplied to the burner 75 with the result that a progressively increasing amount of refrigerant is delivered by the refrigerating system to the cooling member 22a.

When the temperature in the room 10 falls below the predetermined level for which the control device 69 has been set, the thermostat A will actuate valve plate 78 to shut off the conduit 77 and permit the hot gases to pass into conduit 76 to heat the heating member 19a and raise the temperature in the room 10.

It will thus be seen that the control device in this form of the invention selectively controls the operation of the heating and refrigerating systems in response to the temperature conditions inside the room 10 and regulates the amount of heating medium or refrigerant delivered by the corresponding system in response to the temperature conditions outside the room.

Figure 3:
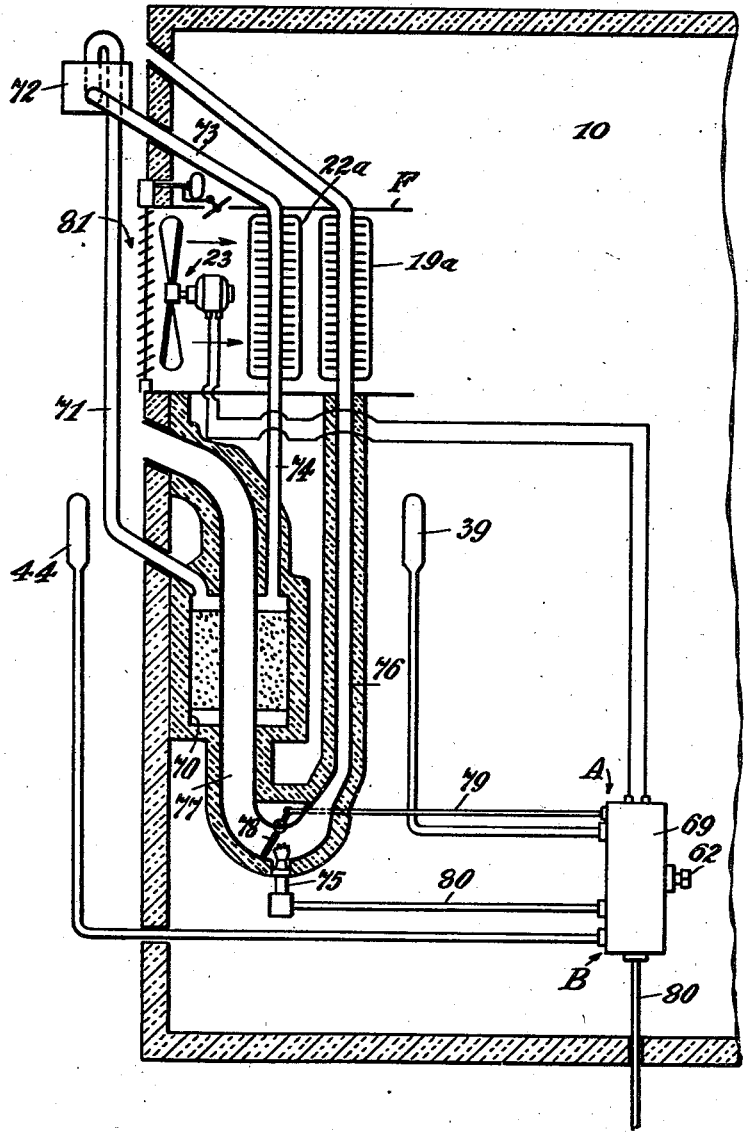
Fig. 3 is a view similar to Fig. 2 but with the heating and cooling systems arranged within the room being controlled.

The air conditioning unit illustrated in Fig. 3 is similar to that just described in connection with Fig. 2 with the exception that the generator 70 of the refrigerating system and the burner 75 are arranged inside the room 10, the air cooled condenser 72 and portions of the connecting conduit 71 and 73 being the only parts located outside the room.

Figure 4:
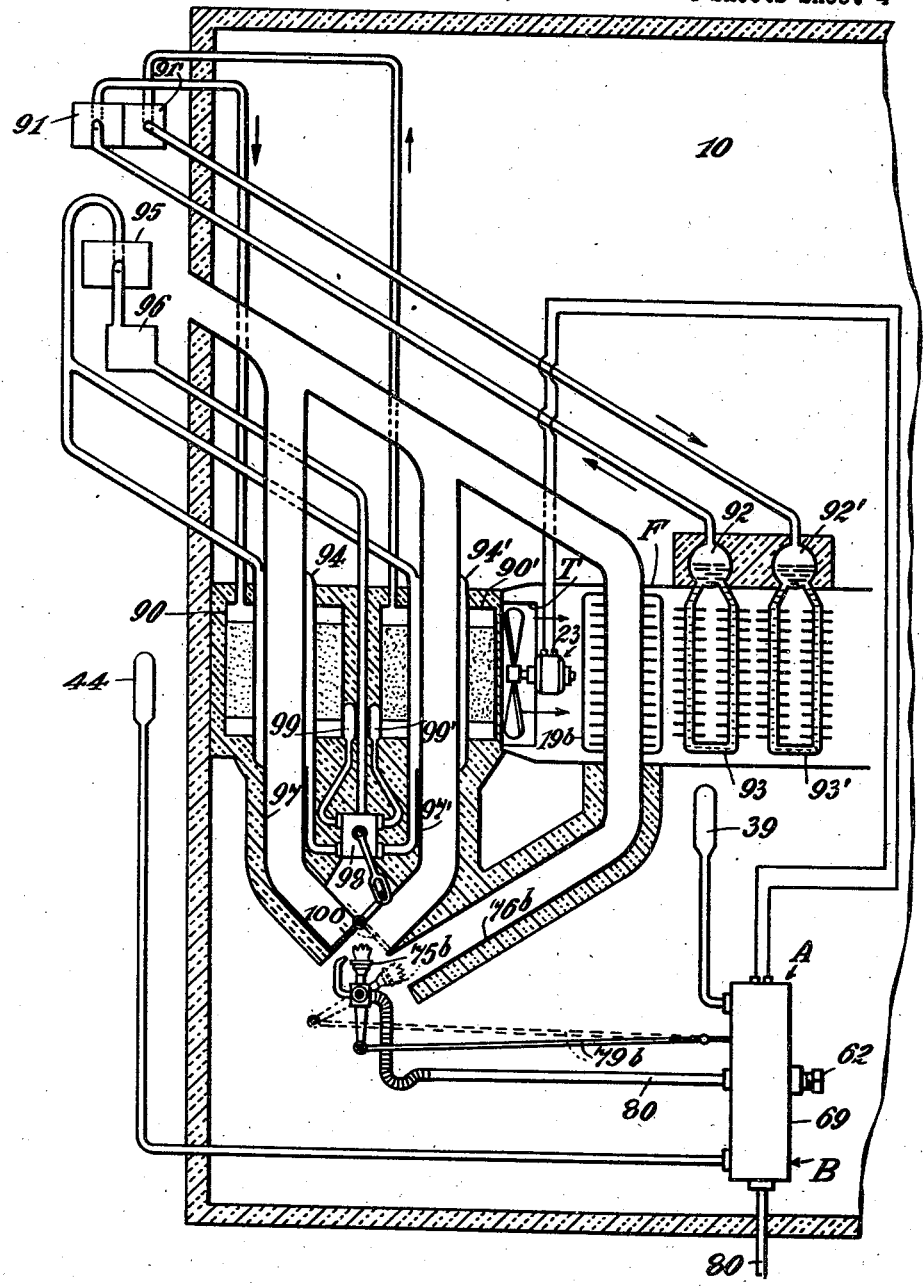
Fig. 4 is a similar view of a modified form of air conditioning unit wherein the cooling system comprises a pair of intermittent absorption refrigerating units operating in alternate phase to one another.

In Fig. 4, I have shown another form of air conditioning unit wherein the refrigerating system comprises a pair of absorption units of the intermittent type arranged adjacent one another in the room 10 and operating in alternate phase to each other. Inasmuch as both absorption units are similar in all respects, only one of the units will be described by reference characters, the other unit being distinguished by the prime of the numeral.

Each absorption unit shown has a primary system for the circulation of the refrigerant used to cool the room 10 and consists of the usual boiler absorber 90 containing any suitable absorbent material capable of absorbing the gaseous refrigerant during the absorption phase and of expelling the same during the generating phase operations of the unit, condenser 91, accumulator 92 and evaporator 93, the latter shown in the form of coils provided with fins or other heat dissipating members, to deliver cold to the room 10.

Each absorption unit also has a secondary system for the circulation of a cooling medium to cool the boiler absorber for the absorption phase operation of the unit and consists of a boiler absorber jacket 94, secondary condenser 95 which may be common to both units, and collecting tank 96 also common to both units.

For the generating phase operation of the units, each boiler absorber is adapted to be heated by any suitable means, that shown in the drawing consisting of a gas burner 75b adapted to deliver hot gases through a pair of flues 97 and 97', which extend centrally through the boiler absorbers 90 and 90', respectively.

The operation of the units from one phase to the other is automatically controlled by a thermostat switch arrangement designated generally as 98 responsive to fluid pressure systems 99 and 99' in thermal contact with the corresponding boiler absorber 90, 90'. Switch arrangement 98 actuates a pair of valves (not shown) for controlling the circulation of the cooling medium in the secondary cooling system to the corresponding boiler absorber jacket 94, 94' for the absorption phase operation of the units. Switch arrangement 98 also actuates a pivoted valve plate 100 arranged in the flues 97, 97', to control the supply of heat to the corresponding boiler absorber for the generating phase operation of the units.

The heating system of the air conditioning unit shown is generally similar to that heretofore described in connection with Figs. 2 and 3 and consists of a heating member 19b and a flue conduit 76b for the passage of hot gases generated by the gas burner 75b. In this form of the invention, the burner is pivotally mounted and is swung from a position in line with the flues 97 and 97' supplying heat to the refrigerating system, to a position in line with the flue 76b supplying heat to the heating system, and vice versa, by means of a reciprocatable rod 79b actuated by the thermostat A of the control device 69b responsive to the temperature inside the room 10. The amount of gas supplied to the burner 75b through gas line 80 is automatically regulated by the thermostat B of the control device, responsive to the conditions outside the room 10.

For convenience in illustrating the various parts of the refrigerating system, the air duct F surrounding the heating member 19b and the cooling members 93, 93', and the fan assembly 23 are shown entirely within the room 10. However, the inlet end of the duct F is shown communicating with a transverse duct or opening T for the entrance of outside air into the room 10.

It will be seen from the above description of the several adaptations of the invention that there is provided a unitary control device which may be located either within the room or the like being controlled, or adjacent the heating and cooling units of the system, or in fact at any convenient place, with only the thermostat impulse lines for the controlling members leading to the various points inside and outside the space being controlled to be influenced by the different temperature conditions.

From the foregoing, it is believed that the construction, operation and advantages of the novel control device herein disclosed may be readily understood by those skilled in the art without further description, it being borne in mind that numerous changes may be made without departing from the spirit of the invention as set out in the following claims.

What I claim and desire to secure by Letters Patent is:

1. In a temperature controlling system including means forming an enclosed space whose temperature is to be controlled; the combination of absorption type refrigerating apparatus for said space including air cooled heat dissipating means arranged outside said enclosed space and refrigerant generating means requiring heat; a source of heated fluid; first means to flow heated fluid from said source in heat transfer relation with said refrigerant generating means; second means to flow heated fluid from said source in heat transfer relation with said enclosed space; valve means selectively controlling the flow of the heated fluid through said first and second means; means responsive to the temperature in said enclosed space for actuating said valve means; and means responsive to outside air temperature for regulating the amount of heated fluid flowing from said source.

2. In a temperature controlling system including means forming an enclosed space whose temperature is to be controlled; the combination of cooling apparatus for said space including two units of respectively different capacities, heating apparatus for said space including two units of respectively different capacities, means responsive to the temperature in said enclosed space selectively controlling the operation of the lower capacity units of the heating and cooling apparatus, and means responsive to the temperature outside said enclosed space selectively controlling the operation of the higher capacity units of the heating and cooling apparatus.

NILS ERLAND AF KLEEN.

REFERENCES CITED

The following references are of record in the file of this patent:

UNITED STATES PATENTS

| Number | Name | Date |
|---|---|---|
| 2,229,612 | Pearce | Jan. 21, 1941 |
| 2,240,354 | Smith | Apr. 29, 1941 |
| 1,776,910 | Hulse | Sept. 30, 1930 |
| 1,943,965 | Hulse | Jan. 16, 1934 |
| 2,004,503 | Hulse | June 11, 1935 |
| 2,064,175 | Otto | Dec. 15, 1936 |
| 2,135,294 | Snediker | Nov. 1, 1938 |
| 2,165,138 | Grubb | July 4, 1939 |